(12) United States Patent
Peng et al.

(10) Patent No.: US 8,698,953 B1
(45) Date of Patent: Apr. 15, 2014

(54) FIELD PROGRAMMABLE DIGITAL IMAGE CAPTURE DEVICE

(75) Inventors: Hsui-Ping Peng, San Jose, CA (US); Jigar Mulchandbhai Bhajiwala, San Jose, CA (US); Marc Jacobs, Redwood City, CA (US)

(73) Assignee: Marvell International Ltd., Hamilton (BM)

( * ) Notice: Subject to any disclaimer, the term of this patent is extended or adjusted under 35 U.S.C. 154(b) by 278 days.

(21) Appl. No.: 12/858,173

(22) Filed: Aug. 17, 2010

Related U.S. Application Data

(60) Provisional application No. 61/238,051, filed on Aug. 28, 2009, provisional application No. 61/239,169, filed on Sep. 2, 2009.

(51) Int. Cl.
*H04N 5/225* (2006.01)
*H04N 5/232* (2006.01)

(52) U.S. Cl.
USPC .................. 348/375; 348/376; 348/211.2

(58) Field of Classification Search
None
See application file for complete search history.

(56) References Cited

U.S. PATENT DOCUMENTS

| | | | |
|---|---|---|---|
| 6,433,818 B1* | 8/2002 | Steinberg et al. | 348/161 |
| 2005/0019030 A1* | 1/2005 | Sasaki et al. | 396/300 |
| 2007/0104474 A1* | 5/2007 | Tamura | 396/91 |
| 2007/0147815 A1* | 6/2007 | Tanaka | 396/56 |
| 2007/0189730 A1* | 8/2007 | Okamura | 386/107 |
| 2007/0288752 A1* | 12/2007 | Chan | 713/171 |
| 2009/0009633 A1* | 1/2009 | Suto | 348/241 |
| 2009/0196456 A1* | 8/2009 | Bisti et al. | 382/100 |
| 2009/0268078 A1* | 10/2009 | Miyazaki et al. | 348/345 |
| 2010/0026875 A1* | 2/2010 | Shirai | 348/335 |
| 2010/0265385 A1* | 10/2010 | Knight et al. | 348/340 |

* cited by examiner

*Primary Examiner* — Lin Ye
*Assistant Examiner* — Euel Cowan

(57) ABSTRACT

Embodiments of the present disclosure provide techniques and configurations to determine, by a digital image capture device, that lens calibration data is to be downloaded for a lens assembly of the digital image capture device and to download the lens calibration data. Other embodiments may be described and/or claimed.

22 Claims, 8 Drawing Sheets

FIELD PROGRAMMABLE DIGITAL IMAGE CAPTURE DEVICE

CROSS REFERENCE TO RELATED APPLICATIONS

The present disclosure claims priority to U.S. Provisional Patent Application No. 61/238,051, filed Aug. 28, 2009, and U.S. Provisional Patent Application No. 61/239,169, filed Sep. 2, 2009, the entire specifications of which are hereby incorporated by reference in their entireties for all purposes, except for those sections, if any, that are inconsistent with this specification.

TECHNICAL FIELD

Embodiments of the present disclosure relate to the field of digital image capture devices, and more particularly, to techniques and configurations to obtain calibration data for a lens and to safeguard the digital image capture device and/or the lens.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital image capture devices such as digital cameras generally use a lens to capture light from an object. However, the light captured by the lens may be distorted due to aberrations in the shape or material structure of the lens. Digital cameras are emerging that include lens calibration data to compensate for distortion effects of a single fixed lens. However, such digital cameras having a single fixed lens do not currently provide a solution for mitigating distortion effects associated with interchangeable lenses.

Further, distortion compensation for a digital image is traditionally performed using a computer system that runs software to process the digital image. In this regard, users of the digital camera generally are not able to compensate for distortion real-time in the field, particularly for interchangeable lenses. The current inability to create or update calibration data for lenses in the field decreases portability of the digital camera and limits a photographer's ability to use different lenses under different conditions.

Still further, lenses and digital cameras are costly to purchase and/or replace. Techniques and configurations are needed to adequately safeguard or protect the lenses and digital cameras from unauthorized use or theft.

SUMMARY

The present disclosure provides a method comprising determining, by a digital image capture device, that lens calibration data is to be downloaded for a lens assembly of the digital image capture device and downloading the lens calibration data.

In an embodiment, said determining that the lens calibration data is to be downloaded for the lens comprises determining that a signature identification of the lens assembly is not stored in the digital image capture device.

In an embodiment, said downloading the lens calibration data comprises downloading the lens calibration data from a storage medium that is external to the digital image capture device using the signature identification of the lens assembly to identify the lens calibration data for downloading.

In an embodiment, the method further comprises using, by an image processor of the digital image capture device, the downloaded lens calibration data to compensate for lens distortion effects of an image captured by the digital image capture device.

In an embodiment, the method further comprises updating the lens calibration data and storing the updated lens calibration data.

In an embodiment, the method further includes receiving a request by a user of the digital image captured device to download updated lens calibration data and downloading the updated lens calibration data based on the request.

The present disclosure further provides an apparatus comprising a processor and a storage medium coupled to the processor, the storage medium having instructions stored thereon, that if executed by the processor, result in determining that lens calibration data is to be downloaded for a lens assembly of a digital image capture device and downloading the lens calibration data.

In an embodiment, the apparatus is further configured such that said determining that the lens calibration data is to be downloaded for the lens comprises determining that a signature identification of the lens assembly is not stored in the digital image capture device.

In an embodiment, the apparatus is further configured such that said downloading the lens calibration data comprises downloading the lens calibration data from a storage medium that is external to the digital image capture device using the signature identification of the lens assembly to identify the lens calibration data for downloading.

In an embodiment, the apparatus is further configured such that the instructions, if executed, further result in using, by an image processor of the digital image capture device, the downloaded lens calibration data to compensate for lens distortion effects of an image captured by the digital image capture device.

In an embodiment, the apparatus is further configured such that the instructions, if executed, further result in updating the lens calibration data and storing the updated lens calibration data.

This brief summary has been provided so that the nature of the present disclosure may be understood quickly. A more complete understanding can be obtained by reference to the following detailed description in connection with the attached drawings and claims.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure describe a field-programmable digital image capture device and associated techniques and configurations. In the following detailed description, reference is made to the accompanying drawings which form a part hereof, wherein like numerals designate like parts throughout. Other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as up/down, back/front, over/under, and top/bottom. Such descriptions are merely used to facilitate the discussion and are not intended to restrict the application of embodiments described herein to any particular orientation.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Digital image capture devices, as used herein, refer to devices that use an image sensor to convert an optical image to an electrical signal. The image sensor can include, for example, a charge-coupled device (CCD), a complementary metal-oxide semiconductor (CMOS) sensor, or video camera tubes, but is not limited to these examples.

Figure 1:
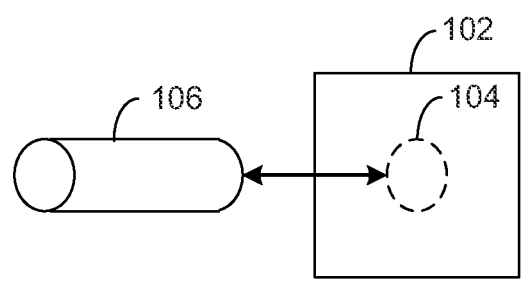
FIG. 1 schematically illustrates a digital image capture device and a lens assembly.

FIG. 1 schematically illustrates a digital image capture device 102 and a lens assembly 106. The digital image capture device 102 may be configured to use one or more lens assemblies (e.g., lens assembly 106). The one or more lens assemblies (hereinafter "lens" or "lenses") may include interchangeable lenses and can include elements in addition to an optical lens element including, for example, housing for the lens and/or a storage medium to store information associated with operation of the lens.

According to various embodiments, each of the one or more lenses is associated with a signature identification (ID) to identify the lens and/or distinguish interchangeable lenses from one another. The signature ID may be unique to a particular lens in some embodiments. For example, in an embodiment, the signature ID is a serial number. In other embodiments, the signature ID for each lens may be associated with a particular type of lens or a batch of lenses that are manufactured together. For example, in an embodiment, the signature ID is a model number. The signature ID can include for example, letters, numbers, and/or symbols.

The digital image capture device 102 includes means 104 to receive one or more lenses (e.g., lens assembly 106). The means 104 to receive the one or more lenses can include, for example, a socket that is configured to mechanically and/or electrically couple the lens assembly 106 to the digital image capture device 102.

Figure 2:
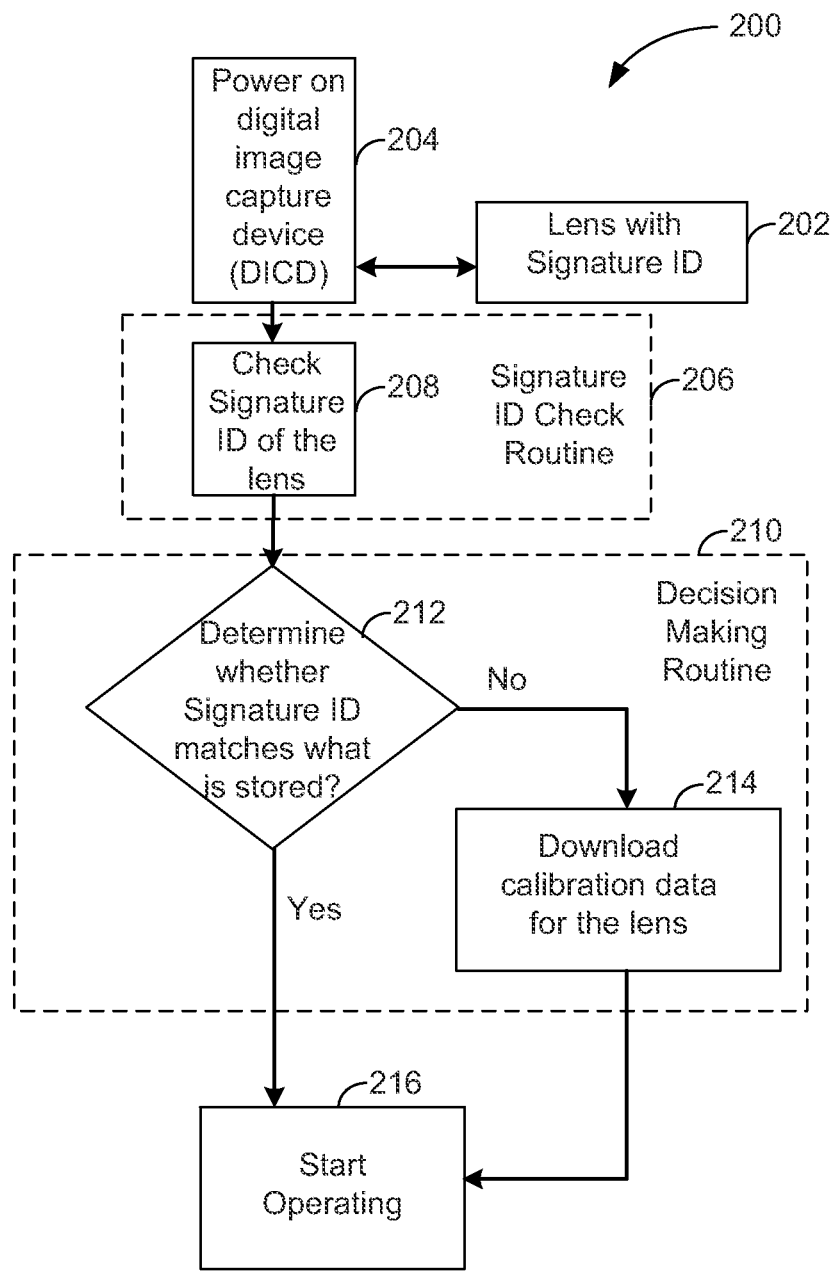
FIG. 2 schematically illustrates a flow chart of a distortion compensation scheme for a lens assembly of a digital image capture device.

FIG. 2 schematically illustrates a flow chart 200 of a distortion compensation scheme for a lens of a digital image capture device. At 202, a lens having a signature ID is physically coupled to a digital image capture device such as a digital camera. The lens may further be electrically coupled to the digital image capture device. The lens may use one or more electrical connections between the lens and the digital image capture device to exchange communication signals and/or to provide power for various features of the lens.

According to various embodiments, the lens includes a storage medium having stored thereon calibration data to compensate for distortion effects of the lens and thus provide better image quality. In an embodiment, the lens includes a storage medium comprising an integrated circuit (IC) device such as, for example, non-volatile memory to store the lens calibration data. Other types of memory can be used in other embodiments. The IC device may be powered using a same power source as an auto-focus feature of the lens.

The calibration data can include, for example, information associated with compensating for x/y distortion, pincushion distortion, barrel distortion, chromatic aberrations, focus, or other aberrations. The calibration data can be either unique to each lens or an averaged or other aggregate value associated with manufacture of a plurality of lenses.

At 204, the digital image capture device is powered on. A user may power on the digital image capture device before or after the lens is physically and/or electrically coupled to the digital image capture device. Subsequent to powering on the digital image capture device, the digital image capture device performs a signature ID check routine at 206. The signature ID check routine includes checking the signature ID of the lens at 208. For example, the digital image capture device may include a module configured to search for, request, and/or obtain a signature ID of the lens.

At 210, the digital image capture device performs a decision making routine to determine whether or not to download calibration data for the lens. In one embodiment, the digital image capture device stores a most recently used lens signature ID in local memory. At 212, the digital image capture device determines whether the signature ID of the lens matches the stored lens signature ID. In one example, the digital image capture device may compare the signature ID of the lens obtained at 208 with the signature ID of the most recently used lens. If the signature ID of the lens obtained at 208 is different than the signature ID of the most recently used lens, then the digital image capture device downloads calibration data for the lens at 214. If the signature ID of the lens obtained at 208 is the same as the signature ID of the most recently used lens, then the digital image capture device starts normal operation at 216.

Other techniques may be used to determine that the lens calibration data is to be downloaded for the lens in the decision making routine at 210. For example, the digital image capture device may determine that the signature ID of the lens obtained at 208 is not stored at all in the local memory. In such a case, the digital image device downloads the calibration data for the lens. Other similar techniques may be used to trigger downloading of calibration data for the lens.

At 214, the digital image capture device downloads calibration data for the lens. The calibration data can be downloaded/retrieved from a storage medium in the lens, a storage medium in the digital image capture device, or a storage medium external to both the lens and the digital image capture device. In an embodiment, a module of the digital image capture device is configured to identify the calibration data for the lens using the signature ID of the lens obtained at 208. For example, the module may be configured to search for the signature ID of the lens in a look-up table stored in the storage medium, where the look-up table has calibration data corresponding with the signature ID.

The storage medium used to store the calibration data can include any suitable form of non-transient storage including, for example, semiconductor storage, magnetic storage, and/or optical storage. The digital image capture device can download the calibration data using any suitable data transfer scheme including, for example, a bus or other input/output (I/O) interface between the lens and the digital image capture device or a Universal Serial Bus (USB) connection to connect the digital image capture device with an electronic system (e.g., 800 of FIG. 8) that is configured to provide the calibration data. For example, the electronic system may communicate and access the lens calibration data either locally at the electronic system or from another electronic system via a wired or wireless communication link. The digital image capture device may access information from a remote server of a manufacturer of the lens to obtain the calibration data.

At 216, the digital image capture device starts operating. For example, the digital image capture device may capture an image of an object. An image processor of the digital image capture device may use the downloaded lens calibration data to compensate for lens distortion effects of the image captured by the digital image capture device. The digital image capture device may store the captured image after using the lens calibration data to compensate for distortion.

Figure 3:
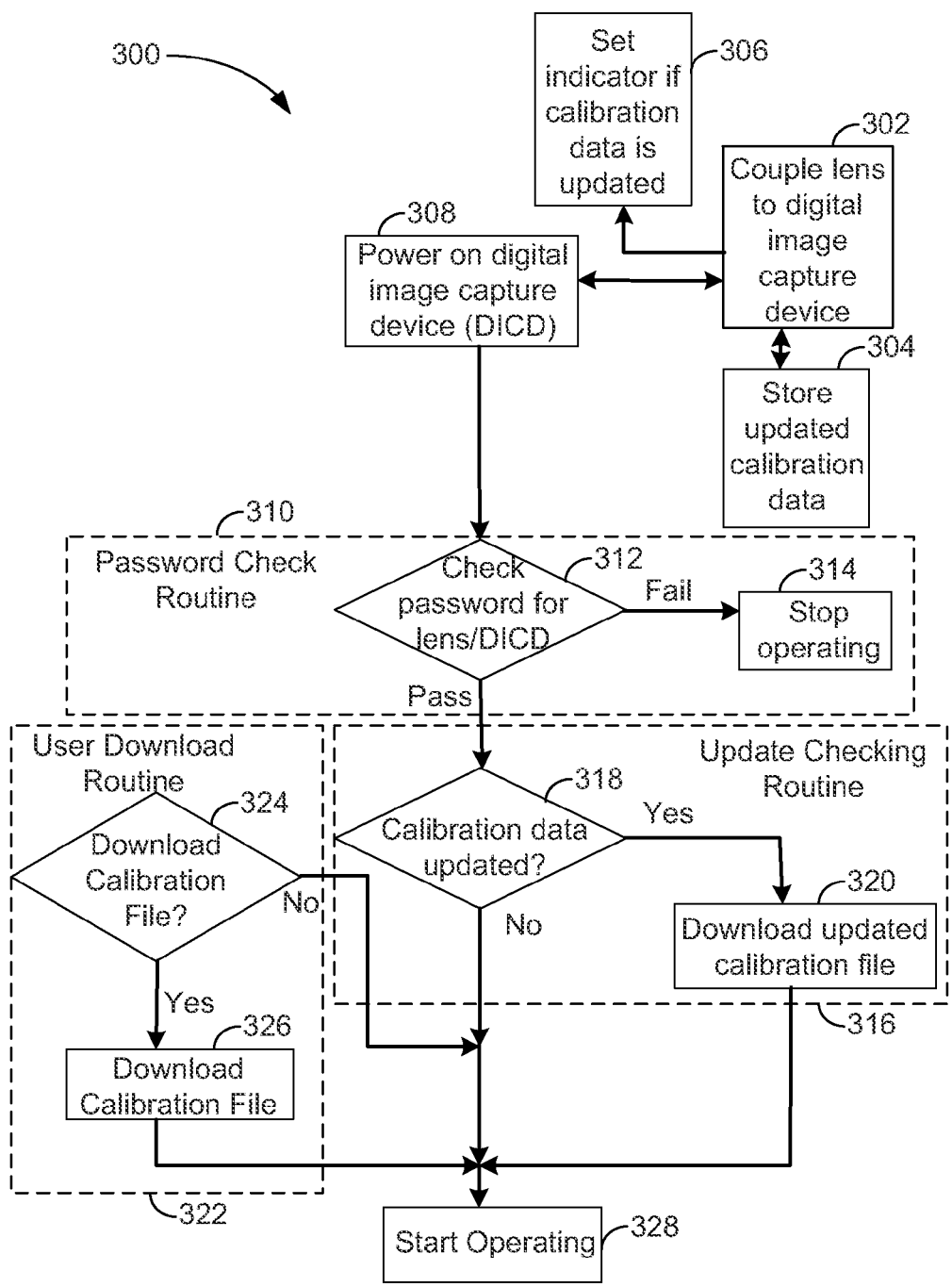
FIG. 3 schematically illustrates a flow chart of additional distortion compensation schemes and a lens security scheme for a lens assembly of a digital image capture device.

FIG. 3 schematically illustrates a flow chart 300 of additional distortion compensation schemes and a lens security scheme for a lens of a digital image capture device. At 302, a lens having a field-programmable lens calibration ability and password protection is physically and/or electrically coupled to a digital image capture device. That is, in some embodiments, the lens is equipped with a field-programmable lens calibration capability that allows a user to calibrate the lens in the field. Temperature or other environmental variables may cause changes within the lens such that previous calibration data corresponding to the lens is no longer accurate.

A user of the digital image capture device can use the field-programmable lens calibration capability to create, update, and/or correct calibration data for the lens to increase image quality. In this regard, lens calibration adjustments can be performed real-time by a user in the field, thus increasing portability and availability of different lenses for a particular digital image capture device or availability of different digital image capture devices for a particular interchangeable lens.

At 304, the lens is configured to store the created, updated, and/or corrected calibration data (hereinafter "new calibration data"). For example, the lens can upload a calibration file including the new calibration data to any suitable storage medium using any suitable data transfer scheme. According to various embodiments, the lens may be configured to store the new calibration data in a storage medium disposed in the lens, a storage medium disposed in the digital image capture device, or a storage medium disposed external to both the lens and the digital image capture device.

At 306, the lens is configured to flag or otherwise set an indicator to indicate that the lens calibration data has been updated. For example, the lens may signal a change to a value of a bit in memory to indicate that the calibration data is new (e.g., updated).

At 308, the digital image capture device is powered on. The digital image capture device may be powered on prior to or subsequent to actions described at 302, 304, and 306.

At 310, the digital image capture device and/or the lens is configured to perform a password check routine. For example, the digital image capture device and/or the lens may be equipped with a field-programmable password protection feature that allows a user to select and/or enter a password that must be verified prior to starting normal operation of the digital image capture device and the lens at 328. According to various embodiments, the digital image capture device and/or the lens is configured to prompt a user of the digital image capture device to create and/or enter a password that is uniquely associated with the digital image capture device and/or the lens.

At 312, the digital image capture device and/or the lens is configured to check the entered password to determine whether the entered password is valid. For example, the digital image capture device and/or the lens may compare the entered password with a password created by the user and/or stored in memory of the digital image capture device and/or the lens. If the entered password is different than the password created by the user and/or stored in the memory, then the password check routine fails and the digital image capture device and/or the lens stop operation at 314. The password check routine may allow multiple failed attempts prior to preventing operation of the digital image capture device and/or the lens in some embodiments. If the entered password is the same as the password created by the user and/or stored in the memory, then the password check routine passes and operation continues.

At 316, the digital image capture device is configured to perform an update checking routine. The update checking routine is performed to determine whether new calibration data has been created, updated, and/or corrected for download. At 318, the digital image capture device may determine whether calibration data has been updated by checking to see whether the indicator (e.g., flag) is set at 306. If the indicator has been set, then the digital image capture device downloads the updated calibration file at 320. If the indicator has not been set, then operation continues (e.g., start operating at 328).

Additionally or alternatively, the digital image capture device may be configured to perform a user download routine at 322. The user download routine allows a user to manually download a new calibration file for a lens. According to various embodiments, a user determines whether or not to download a calibration file at 324 and the calibration file is downloaded at 326 in response to a request from the user to download. For example, the digital image capture device may prompt or query a user of the digital image capture device to indicate whether or not to download the new calibration file. In other embodiments, the digital image capture device includes functionality that allows a user to request download of the new calibration file without a prompt or query from the digital image capture device.

At 328, the digital image capture device and/or the lens start operating. For example, the new calibration data may be used to alter a digital image captured by the digital image capture device. Techniques and configurations described in connection with FIG. 3 may be used in suitable embodiments described in connection with FIG. 2 and vice versa.

Figure 4:
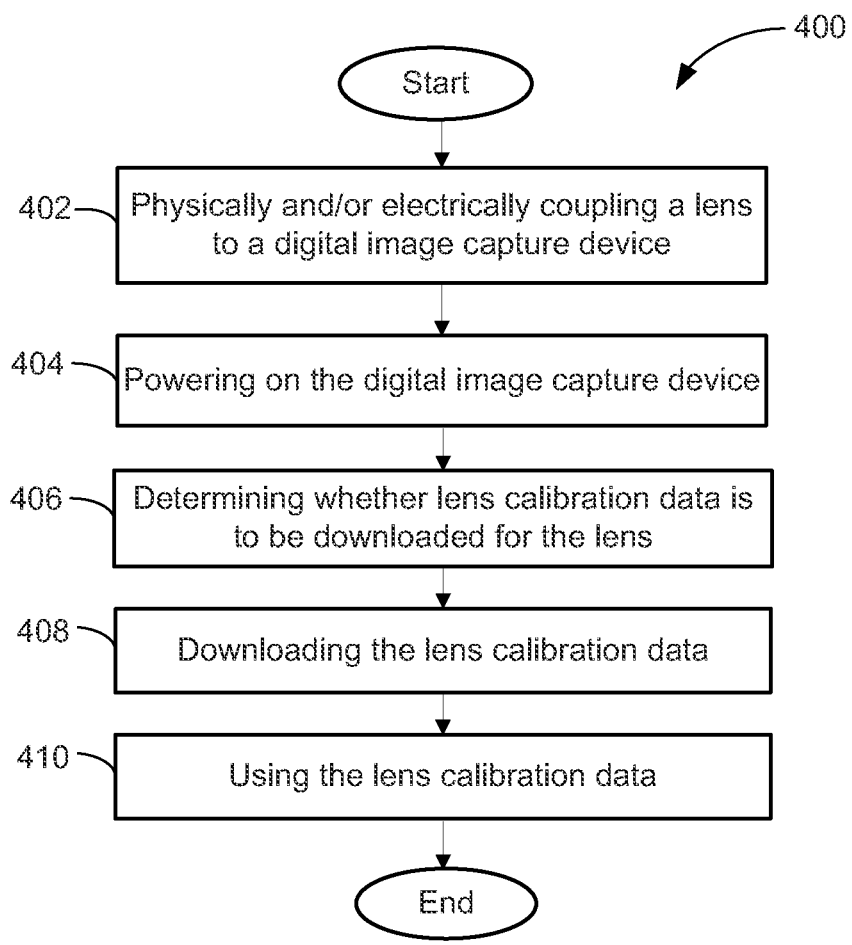
FIG. 4 schematically illustrates a flow diagram of a method for compensating for distortion of a lens assembly of a digital image capture device.

FIG. 4 schematically illustrates a flow diagram of a method 400 for compensating for distortion of a lens assembly of a digital image capture device. At 402, the method 400 includes physically and/or electrically coupling a lens to a digital image capture device. The lens may include, for example, a signature ID, calibration data, field-programmable calibration functionality, and/or field-programmable password protection as described herein. The lens may be physically and/or electrically coupled according to techniques already described herein.

At 404, the method 400 further includes powering on the digital image capture device. The digital image capture device may be powered on prior to or subsequent to physically and/or electrically coupling the lens to the digital image capture device.

At 406, the method 400 further includes determining, by the digital image capture device, whether lens calibration data is to be downloaded for the lens. For example, the digital image capture device may obtain and compare the signature ID of the lens to a stored signature ID (e.g., signature ID of previously used lens) value in memory of the digital image capture device. If the compared signature IDs are the same, then downloading the lens calibration may not be performed. However, if the compared signature IDs are not the same, then the digital image capture device determines that lens calibration data is to be downloaded.

Determining whether lens calibration data is to be downloaded for the lens at 406 can be performed using other techniques. In an embodiment, the digital image capture device determines that the lens calibration data is to be downloaded for the lens if the signature ID of the lens is not stored in the digital image capture device or if a signature ID of the lens is stored in the digital image capture device but the signature ID of the lens is not associated with any calibration data. Other suitable techniques can be used to determine whether lens calibration data is to be downloaded for the lens in other embodiments.

At 408, the method 400 further includes downloading, by the digital image capture device, the lens calibration data. The lens calibration data can be downloaded locally from the digital image capture device/lens or remotely from storage external to the digital image capture device/lens, according to a variety of techniques described in connection with FIG. 2. For example, the lens calibration data may be downloaded from a storage medium that is internal to the lens (e.g., part of the lens assembly), internal to the digital image device, or that is external to both the lens and the digital image capture device.

In an embodiment, the signature ID of the lens may be used to identify which lens calibration data corresponds with the lens. For example, a look-up table may be stored in a storage medium having lens calibration data that corresponds with the signature IDs of various lenses and the signature ID of the lens can be used to find the corresponding lens calibration data.

At 410, the method 400 further includes using the lens calibration data. The lens calibration data may be used, for example, by the digital image capture device to compensate for lens distortion effects or to provide desired aberrations to an image captured by the digital image capture device using the lens.

Figure 5:
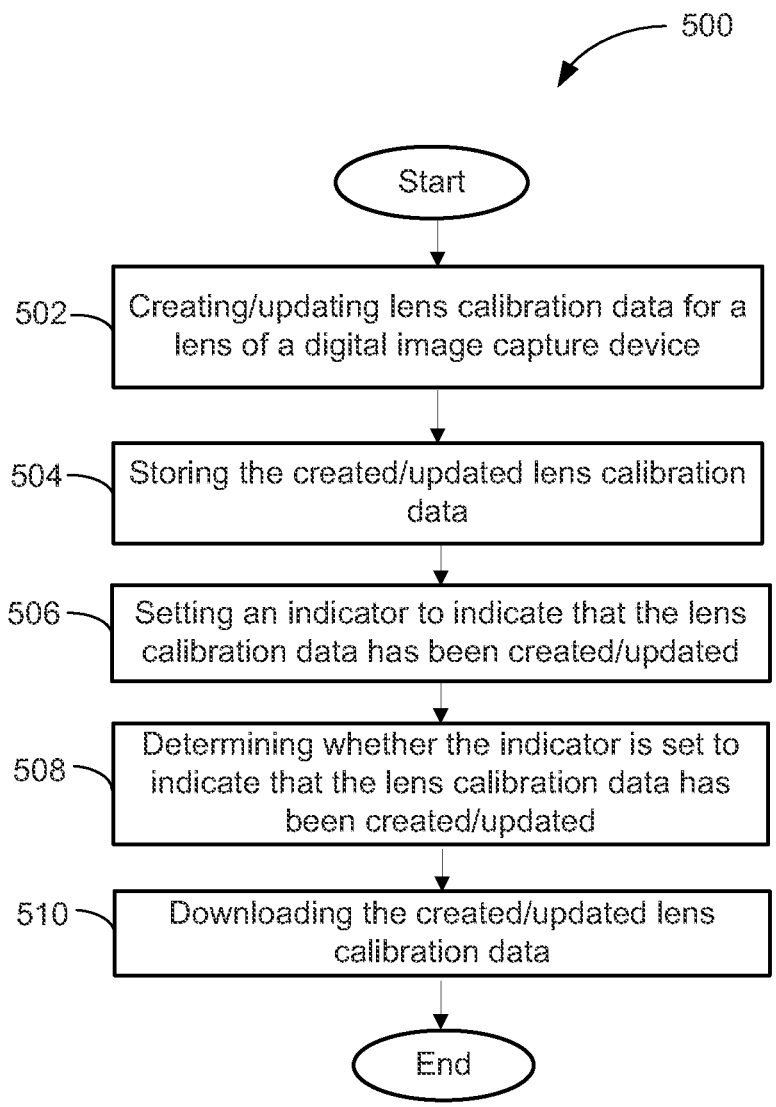
FIG. 5 schematically illustrates a flow diagram of a method for creating/updating lens calibration data for a lens assembly of a digital image capture device.

FIG. 5 schematically illustrates a flow diagram of a method 500 for creating/updating lens calibration data for a lens of a digital image capture device. At 502, the method 500 includes creating and/or updating lens calibration data for a lens to provide new lens calibration for the lens. According to various embodiments, creating and/or updating the lens calibration may be performed by a user of the digital image capture device using only the lens.

At 504, the method 500 further includes storing the created and/or updated lens calibration data. The new lens calibration data can be stored using any suitable storage medium and/or data transfer scheme for download to a digital image capture device that is configured to use the lens.

At 506, the method 500 further includes setting an indicator to indicate that the lens calibration data has been created and/or updated. The indicator may include, for example, a flag set in a memory of the lens to indicate to the digital image capture device that new calibration data is available for download.

At 508, the method 500 further includes determining whether the indicator is set to indicate that the lens calibration data has been created and/or updated. For example, the digital image capture device may run a routine (e.g., update checking routine at 316 of FIG. 3) to determine whether the indicator is set.

At 510, the method 500 further includes downloading the created/updated lens calibration data if it is determined that the indicator is set. The digital image capture device downloads the new calibration data (e.g., calibration file) that is created and/or updated to compensate for distortion or provide other image alterations for images captured by the digital image capture device.

Figure 6:
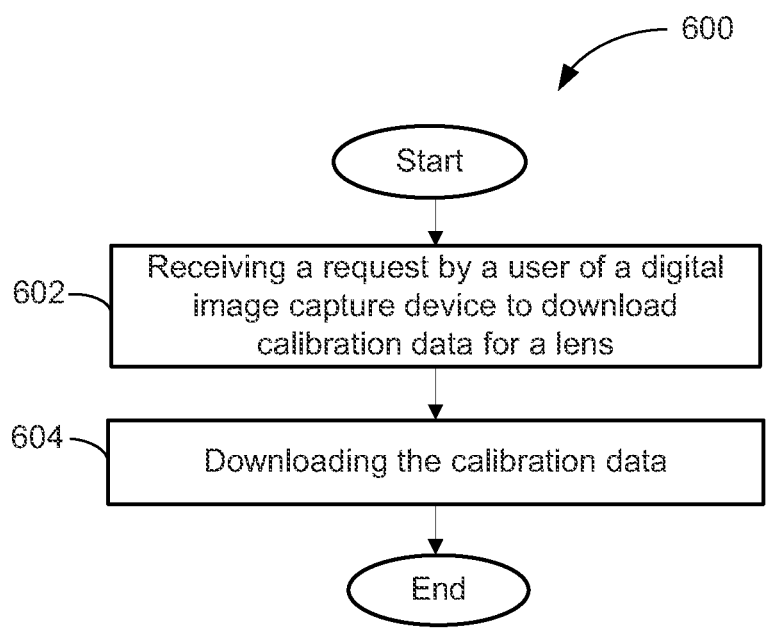
FIG. 6 schematically illustrates a flow diagram of a method for downloading lens calibration data for a lens assembly of a digital image capture device.

FIG. 6 schematically illustrates a flow diagram of a method 600 for downloading lens calibration data for a lens of a digital image capture device. A user of the digital image device may request a download of new calibration data for a lens.

At 602, the method 600 includes receiving a request by a user of the digital image capture device to download calibration data for the lens. The request may be initiated by the user or may be a response to a prompt/query provided by the digital image capture device to the user. At 604, the method 600 further includes downloading the calibration data based on the request received by the user.

Figure 7:
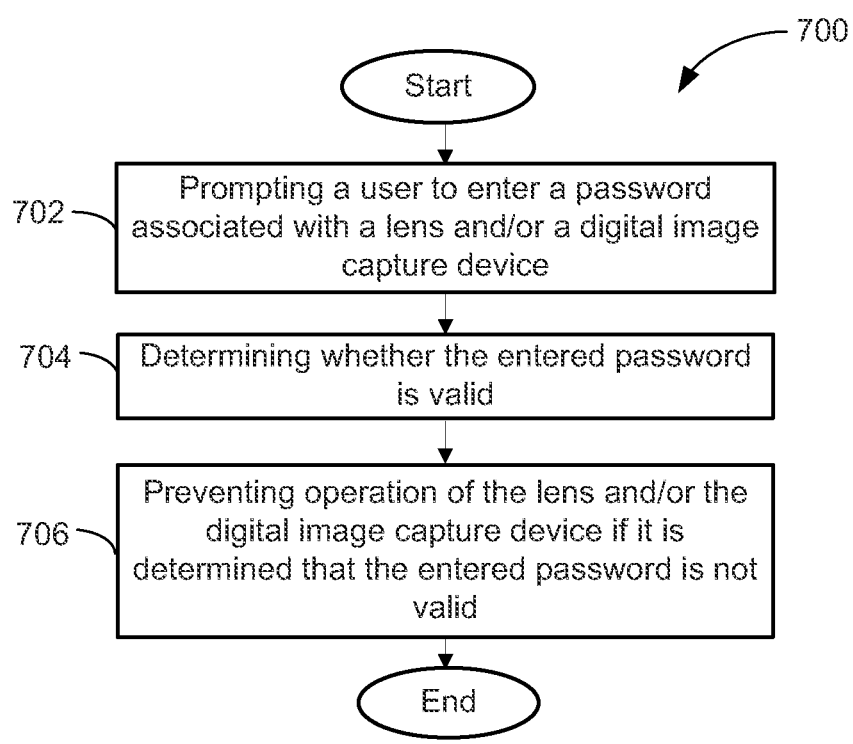
FIG. 7 schematically illustrates a flow diagram of a method for protecting a digital image capture device using a password.

FIG. 7 schematically illustrates a flow diagram of a method 700 for protecting a digital image capture device using a password. At 702, the method 700 includes prompting a user to enter a password associated with a lens and/or a digital image capture device. The password may be uniquely associated with the lens and/or the digital image capture device. At 704, the method 700 further includes determining whether the entered password is valid according to techniques described herein. At 706, the method 700 further includes preventing operation of the lens assembly and/or the digital image capture device if it is determined that the entered password is not valid.

Figure 8:
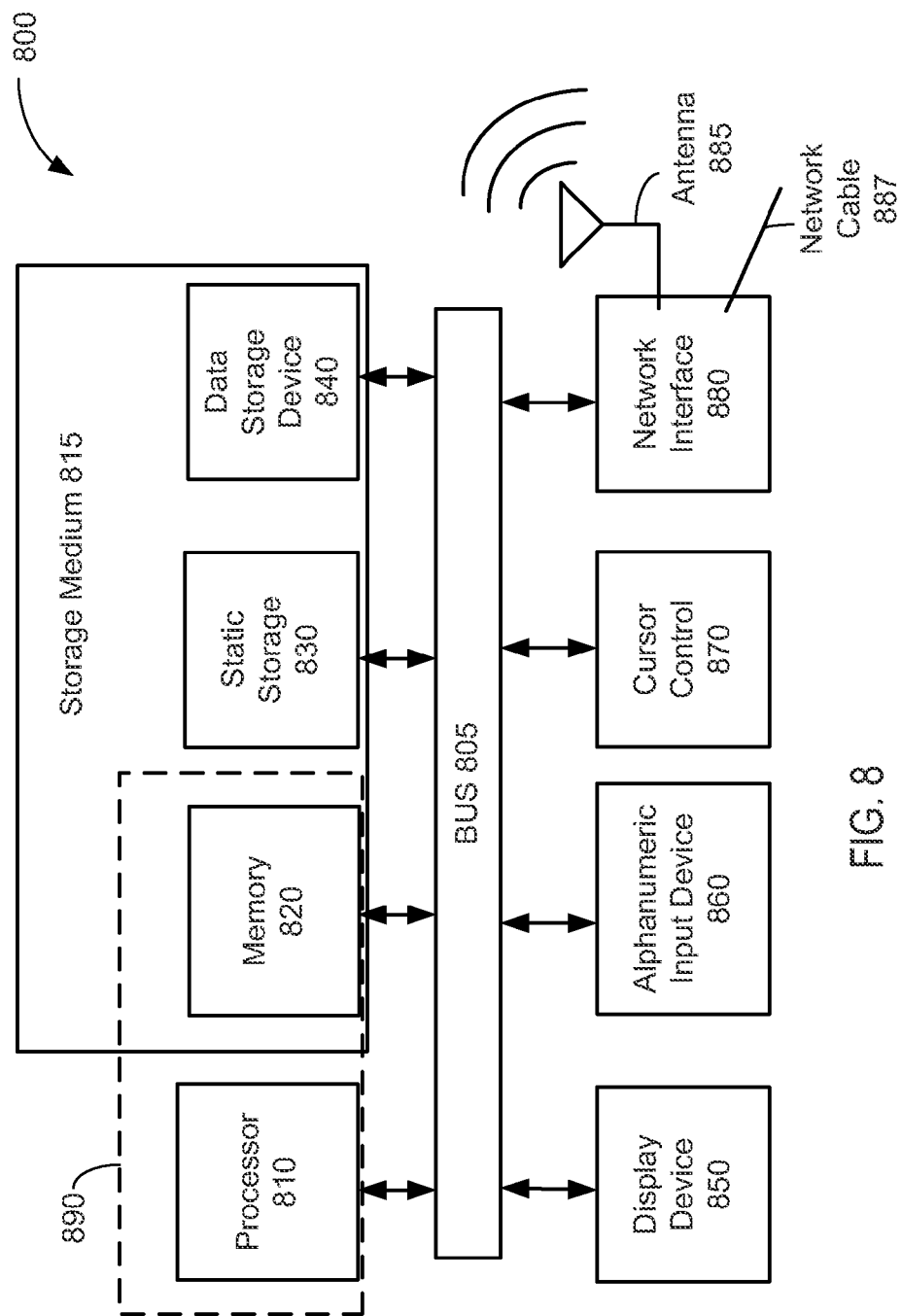
FIG. 8 schematically illustrates an electronic system that can be used to perform various actions described herein.

FIG. 8 schematically illustrates an electronic system 800 that can be used to perform various actions described herein. Electronic system 800 is intended to represent a range of electronic devices (either wired or wireless) including, for example, a digital image capture device/lens assembly, desktop computer devices, laptop computer devices, personal computers (PC), servers, set top boxes, pocket PCs, tablet PCs, DVD players, video players, but is not limited to these examples and can include other electronic devices. Alternative electronic systems can include more, fewer and/or different components.

The electronic system 800 includes a bus 805 or other communication device or interface to communicate information, and processor 810 coupled to the bus 805 to process information. The bus 805 can be a single system bus or a number of buses of the same or different types bridged together. The processor 810 is representative of one or more processors and/or co-processors. According to various embodiments, the processor 810 is an image processor configured to process one or more images captured by a digital image capture device using calibration data as described herein.

The electronic system 800 also includes a storage medium 815, which can include various types of storage such as, for example, memory 820, static storage 830, and data storage device 840. The storage medium 815 is coupled to the bus 805 to store information and/or instructions that are processed and/or executed by processor 810. The storage medium 815 can include more or less types of storage than depicted. The storage medium 815 is an article of manufacture according to some embodiments. In one embodiment, the storage medium 815 includes instructions, that if executed by the processor, result in actions described herein.

The electronic system 800 includes random access memory (RAM) such as dynamic random access memory (DRAM) or other storage device 820 (may be referred to as "memory"), coupled to the bus 805. The memory 820 may be used to store temporary variables or other intermediate information during execution of instructions by processor 810. Memory 820 can include, for example, a flash memory device. The processor 810 and memory 820 may operate together, for example, to provide a calibration data module 890 that executes actions described in connection with a signature ID check routine at 206 of FIG. 2, decision making routine at 210 of FIG. 2, password check routine at 310 of FIG. 3, update checking routine at 316 of FIG. 3, user download routine at 322 of FIG. 3, and other suitable actions described herein.

The electronic system 800 also includes read only memory (ROM) and/or other static storage device 830 coupled to the bus 805 to store static information and instructions for the processor 810. Data storage device 840 is coupled to the bus 805 to store information and instructions. The data storage device 840 can include, for example, a magnetic disk or optical disc and corresponding drive coupled with the electronic system 800.

The electronic system 800 is coupled via the bus 805 to display device 850, such as a cathode ray tube (CRT) or liquid crystal display (LCD), to display information to a user. Alphanumeric input device 860, including alphanumeric and other keys, is coupled to the bus 805 to communicate information and command selections to the processor 810. Cursor control 870 is another type of input device and includes, for example, a mouse, a trackball, touch sensitive input or cursor direction keys to communicate information and command selections to the processor 810 and to control cursor movement on the display 850.

The electronic system 800 further includes one or more network interfaces 880 to provide access to a network, such as a local area network, but is not limited in this regard. The network interface 880 can include, for example, a wireless network interface having antenna 885, which may represent one or more antennae. The network interface 880 can also include, for example, a wired network interface to communicate with remote devices via network cable 887, which can be, for example, an Ethernet cable, a coaxial cable, a fiber optic cable, a serial cable, or a parallel cable.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
receiving, at a digital image capture device, an identification of a lens assembly that is attachable to the digital image capture device, wherein the lens assembly that is attachable to the digital image capture device comprises a lens, and wherein the digital image capture device performs the steps of;
comparing the identification of the lens assembly received at the digital image capture device to an identification of a lens assembly stored at the digital image capture device, wherein the identification of the lens assembly stored at the digital image capture device corresponds to a lens assembly that was previously attached to the digital image capture device;
prompting a user of the digital image capture device to enter a password that is uniquely associated with the lens assembly that is attachable to the digital image capture device,
comparing the password entered by the user with a password stored at the digital image capture device; and
in response to determining that (i) the identification of the lens assembly received at the digital image capture device does not correspond to the identification of the lens assembly stored at the digital image capture device, and (ii) the password entered by the user is the same as the password stored at the digital image capture device
downloading, from a remote device to the digital image capture device, data associated with the lens assembly that is attachable to the digital image capture device, wherein the remote device is external to both the lens assembly and the digital image capture device, and wherein the data downloaded from the remote device is usable by the digital image capture device to calibrate for the lens of the lens assembly that is attachable to the digital image capture device.

2. The method of claim 1, wherein the identification of the lens assembly that is attachable to the digital image capture device is a signature identification for distinguishing between different models of interchangeable lens assemblies that are attachable to the digital image capture device.

3. The method of claim 2, further comprising using the signature identification of the lens assembly that is attachable to the digital image capture device to identify data usable by the digital image capture device to calibrate for a lens of a particular model of an interchangeable lens assembly within a corresponding lens assembly data look-up table that is stored at the remote device.

4. The method of claim 1, further comprising using, by an image processor of the digital image capture device, the downloaded data associated with the lens assembly that is attachable to the digital image capture device to compensate for lens distortion effects of at least one image captured by the digital image capture device when the lens assembly that is attachable to the digital image capture device is coupled to the digital image capture device.

5. The method of claim 1, wherein the lens assembly that is attachable to the digital image capture device is configured to be physically and electrically coupled to the digital image capture device.

6. The method of claim 1, further comprising updating data usable by the digital image capture device to calibrate for the lens of the lens assembly that is attachable to the digital image capture device by storing, at the digital image capture device, the downloaded data associated with the lens assembly that is attachable to the digital image capture device.

7. The method of claim 1, wherein downloading data associated with the lens assembly that is attachable to the digital image capture device comprises:
   receiving, at the digital image capture device, a user request to download data associated with the lens assembly that is attachable to the digital image capture device; and
   in response to receiving the user request, downloading, from the remote device to the digital image capture device, data that is usable by the digital image capture device to calibrate for the lens of the lens assembly that is attachable to the digital image capture device.

8. The method of claim 1, wherein in response to determining that the password entered by the user is not the same as the password stored at the digital image capture device, the method further comprises:
   preventing an operation of the lens assembly that is attachable to the digital image capture device.

9. The method of claim 1, further comprising setting, at the digital image capture device, an indicator to indicate whether the data associated with the lens assembly that is attachable to the digital image capture device has been updated at the remote device.

10. The method of claim 9, further comprising:
   detecting, at the digital image capture device, an indicator set to indicate that the data associated with the lens assembly that is attachable to the digital image capture device has been updated at the remote device, after the lens assembly that is attachable to the digital image capture device has been coupled to the digital image capture device,
   wherein downloading data associated with the lens assembly that is attachable to the digital image capture device further comprises
      in response to detecting the set indicator, downloading, from the remote device to the digital image capture device, the updated data associated with the lens assembly that is attachable to the digital image capture device.

11. An imaging apparatus comprising:
   a socket configured to couple a lens assembly to the imaging apparatus;
   one or more processors; and
   a storage medium coupled to the one or more processors, wherein the imaging apparatus
      receives an identification of a lens assembly that is attachable to the imaging apparatus, wherein the lens assembly that is attachable to the imaging apparatus comprises a lens,
      compares the identification of the lens assembly that is attachable to the imaging apparatus to an identification of a lens assembly that is stored in the storage medium of the imaging apparatus,
      prompts a user of the imaging apparatus to enter a password that is uniquely associated with the lens assembly that is attachable to the imaging apparatus;
      compares the password entered by the user with a password stored at the digital image capture device; and
      in response to (i) the identification of the lens assembly that is attachable to the imaging apparatus not corresponding to the identification of the lens assembly that is stored in the storage medium of the imaging apparatus, and (ii) the password entered by the user is the same as the password stored at the digital image capture device, downloads, from a remote device to the imaging apparatus, data associated with the lens assembly that is attachable to the imaging apparatus, wherein
         the remote device is external to both the lens assembly and the imaging apparatus, and
         the data downloaded from the remote device is usable by the imaging apparatus to calibrate for the lens of the lens assembly that is attachable to the imaging apparatus.

12. The imaging apparatus of claim 11, wherein the identification of the lens assembly that is attachable to the imaging apparatus is a signature identification for distinguishing between different models of interchangeable lens assemblies that are attachable to the imaging apparatus.

13. The imaging apparatus of claim 12, wherein the imagine apparatus uses the signature identification of the lens assembly that is attachable to the imaging apparatus to identify within a corresponding lens look up table of the remote device, data associated with a particular model of an interchangeable lens assembly corresponding to the lens assembly that is attachable to the imaging apparatus.

14. The imaging apparatus of claim 11, wherein the imaging apparatus uses the downloaded data associated with the lens assembly that is attachable to the imaging apparatus to compensate for lens distortion effects of at least one image captured by the imaging apparatus when the lens assembly that is attachable to the imaging apparatus is coupled to the imaging apparatus.

15. The imaging apparatus of claim 11, wherein the imaging apparatus updates data associated with the lens assembly that is attachable to the imaging apparatus by storing the downloaded data associated with the lens assembly that is attachable to the imaging apparatus in the storage medium of the imaging apparatus.

16. The imaging apparatus of claim 11, wherein in response to receiving a user request to download the data associated with the lens assembly that is attachable to the imaging apparatus, the imaging apparatus downloads from the remote device to the imaging apparatus, the data associated with the lens assembly that is attachable to the imaging apparatus.

17. The imaging apparatus of claim 11, wherein upon determining that the password entered by the user is not valid, the imaging apparatus prevents an operation of the lens assembly that is attachable to the imaging apparatus.

18. The imaging apparatus of claim 15, wherein the imaging apparatus sets an indicator to indicate that the data associated with the lens assembly that is attachable to the imaging apparatus has been updated at the remote device.

19. The imaging apparatus of claim 18, wherein the imagine apparatus:
- detects an indicator set to indicate that the data associated with the lens assembly that is attachable to the imaging apparatus has been updated at the remote device, after the lens assembly that is attachable to the imaging apparatus has been coupled to the imaging apparatus; and
- in response to detecting the set indicator, downloads, from the remote device to the imaging apparatus, the updated data associated with the lens assembly that is attachable to the imaging apparatus.

20. The imaging apparatus of claim 11, further comprising a network interface coupled to the one or more processors, the network interface configured to provide a wireless communication link between the imaging apparatus and the remote device,
- wherein the data associated with the lens assembly that is attachable to the imaging apparatus is downloaded to the imaging apparatus from the remote device using the wireless communications link of the network interface component.

21. The method of claim 1, wherein the remote device comprises a computer server.

22. The imaging apparatus of claim 11, further comprising the lens assembly that is attachable to the imaging apparatus, wherein the lens assembly that is attachable to the imaging apparatus is configured to (i) perform a password check routine and (ii) prompt the user of the imaging apparatus to enter the password that is uniquely associated with the lens assembly that is attachable to the imaging apparatus.

* * * * *